United States Patent
Choi et al.

[11] Patent Number: 6,157,750
[45] Date of Patent: *Dec. 5, 2000

[54] METHODS OF TRANSFORMING A BASIC SHAPE ELEMENT OF A CHARACTER

[75] Inventors: Hyeong In Choi, 1-1403, Daerim Apt., 217, Bangi-Dong, Songpa-Ku; Nam Sook Wee; Kyung Hwan Park; Sung Jin Lee; Sung Woo Choi; Hwan Pyo Moon; Seung Won Song; Myung Joo Baek; Jin Young Kim; Shin Hae Tahk, all of Seoul; Hyun Joo Choi, Kyongki-Do; Hal Lan Yang; Jeong Han Kim, both of Seoul, all of Rep. of Korea

[73] Assignees: Hyundai Electronics Industries Co., Ltd., Kyoungkido; Hyundai Media Systems Co., Ltd.; Hyeong In Choi, both of Seoul, all of Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/829,387

[22] Filed: Mar. 31, 1997

[30] Foreign Application Priority Data

Apr. 2, 1996 [KR] Rep. of Korea .......................... 96-9928

[51] Int. Cl.[7] ...................................... G06K 9/32
[52] U.S. Cl. ......................... 382/301; 382/199; 382/203; 382/259; 382/276; 345/468; 345/472
[58] Field of Search .................................. 382/301, 288, 382/293, 298; 345/467, 468, 469, 470, 142, 471, 472

[56] References Cited

U.S. PATENT DOCUMENTS

| | | | |
|---|---|---|---|
| 4,553,215 | 11/1985 | Masuda et al. | 430/307 |
| 4,736,436 | 4/1988 | Yaukawa et al. | 382/154 |
| 4,748,443 | 5/1988 | Uehara et al. | 345/142 |
| 4,750,212 | 6/1988 | Yokomizo | 382/235 |
| 4,751,660 | 6/1988 | Hedley | 345/425 |
| 4,797,842 | 1/1989 | Nackman et al. | 364/578 |
| 4,817,038 | 3/1989 | Knoll et al. | 250/363.09 |
| 4,897,638 | 1/1990 | Kokunishi et al. | 345/142 |
| 4,931,953 | 6/1990 | Uehara et al. | 345/467 |
| 5,021,974 | 6/1991 | Pisculli et al. | 364/518 |
| 5,325,446 | 6/1994 | Kato et al. | 382/269 |
| 5,719,947 | 2/1998 | Enomoto et al. | 382/107 |
| 5,760,846 | 6/1998 | Lee | 348/699 |
| 5,852,447 | 12/1998 | Hosoya et al. | 345/468 |

FOREIGN PATENT DOCUMENTS

| | | |
|---|---|---|
| 0167838 | 1/1986 | European Pat. Off. . |
| 0389131 | 9/1990 | European Pat. Off. . |
| 2236935 | 4/1991 | United Kingdom . |

*Primary Examiner*—Leo H. Boudreau
*Assistant Examiner*—Gregory Desire
*Attorney, Agent, or Firm*—Blakely Sokoloff Taylor & Zafman

[57] ABSTRACT

The present invention relates to an outline font. The purpose lies in supplying a transforming and rendering method in the shape where the important form of the shape, such as the thickness of the stroke, will be maintained from the basic shape, and at the same time the whole size of the shape can be fitted into a given bounding box. The present invention supplies the transformation method of a handwriting font including searching for the medial axis of a given element, obtaining contact points by using maximal inscribed circles with the medial axis and points of the medial axis as a center, and applying the information about the medial axis points and the contact points in case of a transformation of the element in the transformation method of handwriting where a given element can be optionally transformed in sizes in order to achieve the purpose. The present invention enables the transformation of the shape. In resizing the given element from the box surrounding element to the box where the new element is placed, the important form of the shape, such as the thickness of the stroke, is maintained, and at the same time the size of the whole is transformed in accordance with the optionally given box.

11 Claims, 11 Drawing Sheets

FIG. 3

BIFURCATION AND 1-PRONG CIRCLES

| CENTER | RADIUS | POINTS | | |
|---|---|---|---|---|
| (587,534) | 33.685679 | (621,353) | (586,388) | (560,334) |
| (593,285) | 39.436658 | (632,276) | (559,303) | (608,249) |
| (649,316) | 6.100000 | (656,316) | | |
| (606,312) | 41.776937 | (630,347) | (564,319) | (640,288) |
| (249,55) | 3.623534 | (246,53) | | |
| (869,76) | 21.920310 | (885,60) | | |
| (845,379) | 21.505929 | (863,390) | | |
| (273,389) | 0.050000 | (273,389) | | |

302

2-PRONG CIRCLE

| CENTER | RADIUS | POINTS | |
|---|---|---|---|
| (722,372) | 20.465642 | (718,392) | (721,351) |
| (578,377) | 27.466434 | (747,420) | (757,350) |
| (818,377) | 29.529392 | (821,406) | (817,347) |
| (833,376) | 28.445123 | (839,403) | (834,347) |
| (550,368) | 19.610456 | (541,351) | (550,387) |
| (502,369) | 18.150000 | (502,351) | (502,387) |
| (436,368) | 20.121754 | (440,348) | (436,388) |
| (393,360) | 29.685434 | (407,333) | (394,389) |
| (380,360) | 29.930461 | (371,331) | (381,390) |
| (302,380) | 15.696656 | (294,366) | (304,395) |
| (286,386) | 11.398465 | (277,379) | (285,398) |
| (280,388) | 7.552649 | (273,388) | (273,390) |
| (572,261) | 34.407303 | (569,237) | (544,281) |
| (401,121) | 23.562523 | (412,99) | (388,140) |
| (270,62) | 9.687234 | (271,52) | (266,71) |
| (630,253) | 18.168654 | (641,267) | (618,240) |
| (734,174) | 24.784723 | (743,197) | (718,155) |
| (783,149) | 36.878788 | (792,185) | (761,120) |
| (806,136) | 41.451297 | (833,167) | (785,100) |
| (856,89) | 34.109566 | (886,106) | (841,58) |
| (597,330) | 32.863506 | (564,324) | (621,353) |
| (600,300) | 39.547724 | (633,278) | (563,313) |
| (629,315) | 24.663992 | (647,332) | (650,302) |

BIFURCATION AND 1-PRONG CIRCLES

| CENTER | RADIUS | POINTS | | |
|---|---|---|---|---|
| (658,846) | 33.685679 | (691,839) | (660,879) | (630,827) |
| (665,762) | 39.436658 | (703,752) | (632,782) | (670,723) |
| (732,799) | 6.100000 | (738,799) | | |
| (680,795) | 41.776937 | (707,827) | (639,803) | (710,766) |
| (254,484) | 3.623534 | (251,482) | | |
| (995,509) | 21.920310 | (1010,493) | | |
| (966,875) | 21.505929 | (984,887) | | |
| (282,887) | 0.050000 | (282,887) | | |

502

2-PRONG CIRCLE

| CENTER | RADIUS | POINTS | |
|---|---|---|---|
| (819,867) | 20.465642 | (816,887) | (818,846) |
| (862,874) | 27.466434 | (852,899) | (862,846) |
| (933,873) | 29.529392 | (936,903) | (932,844) |
| (952,872) | 28.445123 | (958,899) | (952,843) |
| (614,862) | 19.610456 | (605,845) | (614,882) |
| (557,863) | 18.150000 | (556,845) | (556,881) |
| (477,862) | 20.121754 | (481,842) | (477,882) |
| (426,852) | 29.685434 | (439,826) | (426,882) |
| (410,853) | 29.930461 | (402,824) | (412,882) |
| (317,877) | 15.696656 | (310,863) | (320,893) |
| (297,885) | 11.398465 | (290,877) | (297,896) |
| (291,887) | 7.552649 | (284,884) | (285,892) |
| (639,733) | 34.407303 | (664,709) | (611,753) |
| (436,563) | 23.562523 | (446,542) | (423,583) |
| (279,492) | 9.687234 | (280,482) | (275,501) |
| (709,724) | 18.168654 | (720,738) | (697,710) |
| (833,628) | 24.784723 | (843,650) | (818,608) |
| (892,598) | 36.878788 | (903,633) | (871,567) |
| (920,581) | 41.451297 | (947,613) | (898,546) |
| (979,525) | 34.109566 | (1008,543) | (963,495) |
| (669,816) | 32.863506 | (637,810) | (694,838) |
| (673,780) | 39.547724 | (707,758) | (636,793) |
| (708,798) | 24.663992 | (723,818) | (726,782) |

504

512     514     516

FIG. 6
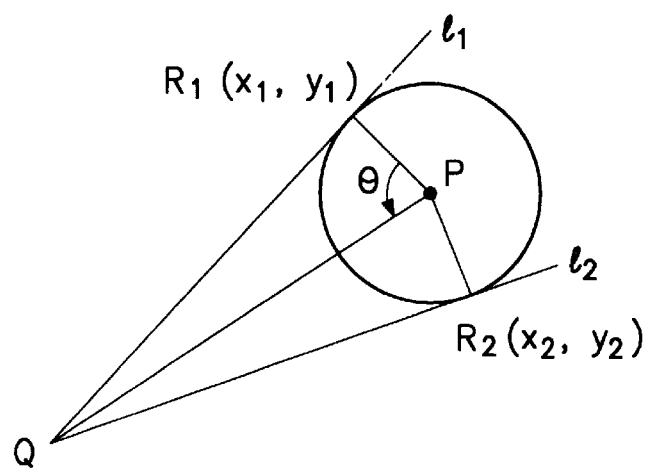
FIG. 7A
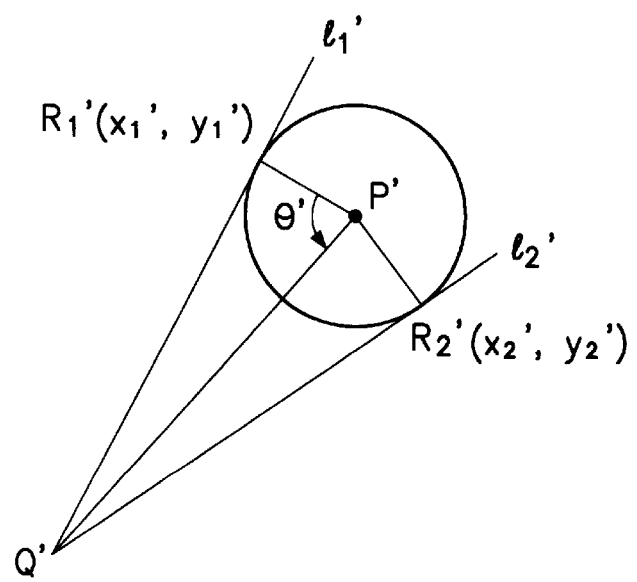
FIG. 7B

FIG. 13

| | | | | | | |
|---|---|---|---|---|---|---|
| 818 | 846 | C | 636 | 793 | C | |
| 852 | 846 | O | 636 | 793 | O | |
| 862 | 846 | C | 632 | 782 | C | |
| 932 | 844 | O | 611 | 753 | C | |
| 947 | 843 | C | 611 | 753 | O | |
| 952 | 843 | O | 552 | 670 | C | |
| 1010 | 843 | C | 423 | 583 | O | |
| 984 | 887 | O | 352 | 535 | C | |
| 979 | 895 | C | 275 | 501 | O | |
| 958 | 899 | O | 247 | 489 | C | |
| 958 | 899 | C | 251 | 482 | O | |
| 948 | 901 | O | 253 | 478 | C | |
| 936 | 903 | C | 280 | 482 | O | |
| 877 | 909 | O | 280 | 482 | C | |
| 852 | 899 | C | 349 | 494 | O | |
| 822 | 888 | O | 446 | 542 | C | |
| 816 | 887 | C | 557 | 596 | O | |
| 751 | 879 | O | 664 | 709 | C | |
| 614 | 882 | C | 680 | 725 | D | |
| 614 | 882 | O | 697 | 710 | C | |
| 593 | 882 | C | 697 | 710 | O | |
| 556 | 881 | O | 785 | 633 | C | |
| 477 | 882 | C | 818 | 608 | O | O=OFF-POINT |
| 426 | 882 | O | 871 | 567 | C | C=ON-POINT(CURVE) |
| 423 | 882 | C | 898 | 546 | C | D=ON-POINT(CURVE) |
| 412 | 882 | O | 963 | 495 | O | |
| 361 | 885 | C | 995 | 478 | C | |
| 320 | 893 | O | 1010 | 493 | O | |
| 301 | 896 | C | 1028 | 511 | C | |
| 297 | 896 | O | 1008 | 543 | C | |
| 288 | 896 | C | 1008 | 543 | O | |
| 285 | 892 | O | 985 | 581 | C | |
| 282 | 887 | S | 947 | 613 | O | |
| 284 | 884 | C | 934 | 624 | C | |
| 284 | 884 | O | 903 | 633 | O | |
| 286 | 880 | C | 843 | 650 | C | |
| 290 | 877 | O | 795 | 673 | O | |
| 294 | 872 | C | 720 | 738 | C | |
| 310 | 863 | O | 703 | 753 | D | |
| 358 | 837 | C | 707 | 758 | C | |
| 402 | 824 | O | 707 | 758 | O | |
| 422 | 818 | C | 711 | 766 | C | |
| 439 | 826 | O | 726 | 782 | O | |
| 472 | 841 | C | 726 | 782 | C | |
| 481 | 842 | O | 738 | 795 | O | |
| 502 | 846 | C | 738 | 799 | C | |
| 556 | 845 | O | 738 | 806 | O | |
| 605 | 845 | C | 723 | 818 | C | |
| 633 | 830 | O | 723 | 818 | C | |
| 637 | 810 | C | 694 | 838 | O | |
| 637 | 810 | O | 694 | 838 | C | |
| 639 | 801 | O | 686 | 847 | D | |
| | | | 818 | 846 | C | |

METHODS OF TRANSFORMING A BASIC SHAPE ELEMENT OF A CHARACTER

FIELD OF THE INVENTION

This invention relates to an outline font, and more particularly to methods of transforming the basic shape elements of character that comprise each character in a font in such a manner as to fit a prescribed bounding box of any size while maintaining the important aesthetic qualities of the shape, such as the thickness of the stroke. (Basic shape element is a whole or a part of shape that comprises a character, and it is typically a Jamo or a stroke. However it can be any distinctive shape that is salient in a character, or it can be a whole character itself. 'Jamo' is a basic alphabetic building block of a Korean character; and its list can be found in the Unicode. Its usage is illustrated more in the Background of the Invention.)

The transformation methods of this invention can relieve the drudgery of the conventional font making process, and as a result it is now possible to generate Korean fonts or CJK unified ideographs of Unicode fonts in a very efficient and labor saving manner; and the rendering methods of this invention can be used to write a hinting program or to design a more efficient rasterizer.

But it can be applied to all the other characters including Latin, Greek or Cyrillic fonts as well.

THE BACKGROUND OF THE INVENTION

The main problem in producing Korean or Chinese fonts, or, for that matter, Unicode fonts, arises from the fact that there are an overwhelming number of characters. In the case of modern Korean, 11,172 characters are needed to express all of the present Korean language. In Unicode, archaism in the Korean language can only be expressed as a combination of Unicode's Jamos, in which case hundreds of thousands of characters are logically possible. It is true that most of those archaisms are meaningless, yet there are more than 20,000 characters which have been recorded at least once in the classics. Likewise, in Unicode, there are more than 20,000 CJK (Chinese, Japanese, and Korean) Unified Ideographs. Even worse, there are a lot more Chinese characters not included in the Unicode. Therefore, the production of these characters is quite a laborious process which requires a considerable investment of time and manpower. The kind of problem this sheer number creates is not as visible in the production of the western font families such as Latin, Greek, or Cyrillic fonts. And even if a Korean, a Chinese or a Unicode font is produced, it is very difficult to maintain the font quality due to the irregularity of the important font features such as the uniformity of the thickness of the stroke or even the look and feel of the basic shape elements. And in the case of the screen font, the difficulty of hinting is even more acute.

To better understand the present invention, some more explanation is in order. For example, the Korean characters '자' and '잠' have the same first Jamo 'ㅈ' and 'ㅈ' in both cases is generally accepted as being of the same shape but of different sizes. In the conventional font making process, the font designer draws each character '자' or '잠' as a separate picture (ideograph) and the same process is repeated over and over again for all the characters. Some font manufacturers use a slightly different procedure. They first produce 'ㅈ' in many typically used sizes, and stockpile them as templates. When they make a character, they figure out which Jamos in which sizes are needed, and substitute them with those that approximate the closest. This process makes the work efficient and is referred to as the Chogja method. The same method is applied to Chinese characters: Namely, each character is disassembled according to the constituent strokes; and the stroke whose size most closely matches the requirement is picked among the stockpiled ones; and then these selected strokes are put together to produce the characters. This process is called the stroke separation method. These methods, such as Chogja or stroke separation method, help alleviate the drudgery, but there are still disadvantages. Namely, even in this case thousands of Jamos or strokes are needed to produce a Korean font of any decent quality, and even in this case, top-class font designers routinely reject the output as not meeting the quality requirement. For that reason, many designers still prefer making each character as a complete character (ideograph) one by one. A similar problem occurs in the making of a Chinese font or CJK unified ideographs.

Furthermore, in the Chogja method or in the conventional method of drawing each character (ideograph) one by one, the problem of disuniformity in the basic shape elements still plagues the entire font.

Medial Axis Transform and Explanation of Terminologies

A planar shape that represents a basic shape element or a character can be expressed by a computer graphics object known as the medial axis transform. The medial axis of a shape is the set of the centers of all the maximal inscribed circles, and when the radius information is also included, it is called the medial axis transform. The medial axis transform was first studied by Blum, and after him, many authors, including D. T. Lee, R. L. Drysdale, M. Held, V. Srinivasan, L. R. Nackman, and C. K. Yap have studied and suggested various methods of calculating the medial axis transform. More recently, the present inventors have also written research papers on computing the medial axis transform. Therefore, there are many practical ways of computing the medial axis transform; and it should be noted that the present invention presumes the method of finding the medial axis transform is of public knowledge; and the main concern of the present invention is on how to apply the medial axis transform to the font technology. One more comment is in order. The original definition of the medial axis requires all maximal inscribed circles to be found. But for the purpose of this invention, only a few of the maximal inscribed circles are needed, and the medial axis can be well approximated with these finite number of circles.

FIG. 2 shows the Korean Jamo 'ㅈ'. The circles in FIG. 2 are maximal inscribed circles, and instead of finding every possible inscribed circles, only a few of them are found and the medial axis transform is then approximated with these chosen circles.

There is one terminology which the present invention uses that needs clarification: namely, the n-prong circles. As can be seen in FIG. 2, Circles 202, 206, and 208 are maximal inscribed circles. A maximal inscribed circle makes contact with the boundary curve at a finite number of points. For example, Circle 202 has three points in common with the boundary and Circle 206 has two points in common with the boundary, and Circle 208 has one point in common with the boundary. We call the circle an n-prong circle if it has n points in common with the boundary. Therefore Circle 202 is a three prong circle, Circle 206 a two prong circle and Circle 208 a one prong circle. Also, if the number of contact points of a maximal inscribed circle with the boundary is at least three, we call it a bifurcation circle.

SUMMARY OF THE INVENTION

Therefore, the present invention has been made in view of the above mentioned problems and provides a transformation method to generate a new shape where the important form of the original shape, such as the thickness of the stroke, is maintained from the original shape, and at the same time the total size of the shape can be fitted into a given bounding box of any size.

In order to achieve the objective of the present invention, there is disclosed a method of transforming the given basic shape element to a new one of any prescribed size which is formed by the steps of: searching for a medial axis of said basic shape element; obtaining contact points of maximal inscribed circles; and moving said points of the medial axis and corresponding contact points.

Also, according to another aspect of the present invention, there is disclosed a method of transforming the given basic shape element to a new one of any prescribed size which is formed by the steps of: searching for a medial axis of said basic shape element; setting guide lines; obtaining contact points of maximal inscribed circles; and moving said points of the medial axis by using said guide lines and locating the said contact points.

Also, according to yet another aspect of the present invention, there is disclosed a method of transforming a basic shape element to fit a predetermined box of any size comprising the steps of: searching for a medial axis transform of said basic shape; moving said medial axis transform; and calculating an envelope curve by the moved medial axis transform of the previous step.

BRIEF DESCRIPTION OF THE DRAWINGS

A further understanding of the nature and advantage of the present invention will become apparent by reference to the remaining portions of the specification and drawings.

FIG. 3 shows an example of the data of the shape 'ㅈ' in FIG. 2 and its medial axis information;

FIG. 5 shows an example of the data of the transformed shape of 'ㅈ' and its medial axis information;

FIG. 6 shows an example of the parameter of the Affine transform used;

FIGS. 7a and 7b show data related to the 2-prong algorithm;

FIG. 13 shows data including the off-points shown in FIG. 12.

DETAILED DESCRIPTION OF THE PREFERRED EMBODIMENT

A detailed description of an embodiment according to the present invention will be given below with reference to figures.

Once an outline of a basic character is provided by a font designer, the medial axes associated with the provided outline are calculated and also the radii and contact points are calculated based on the calculated medial axis.

Figure 1:
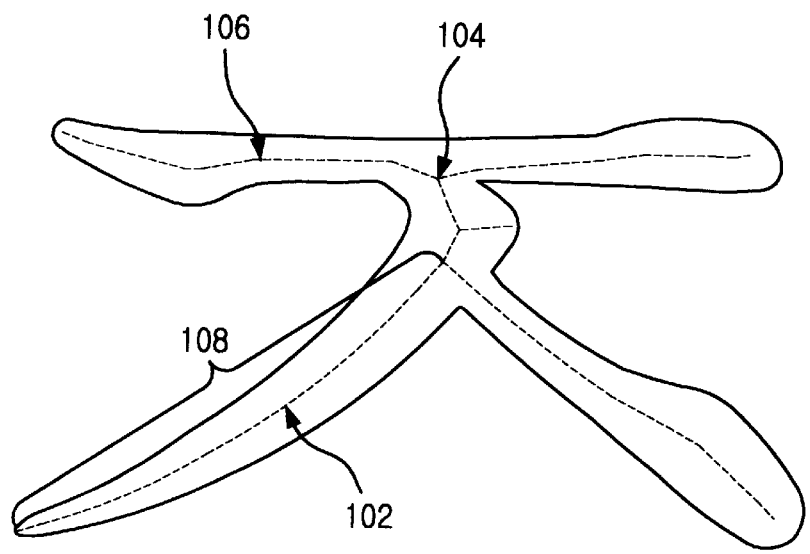
FIG. 1 shows an example of the shape and the medial axis of the Korean character 'ㅈ'.
Figure 2:
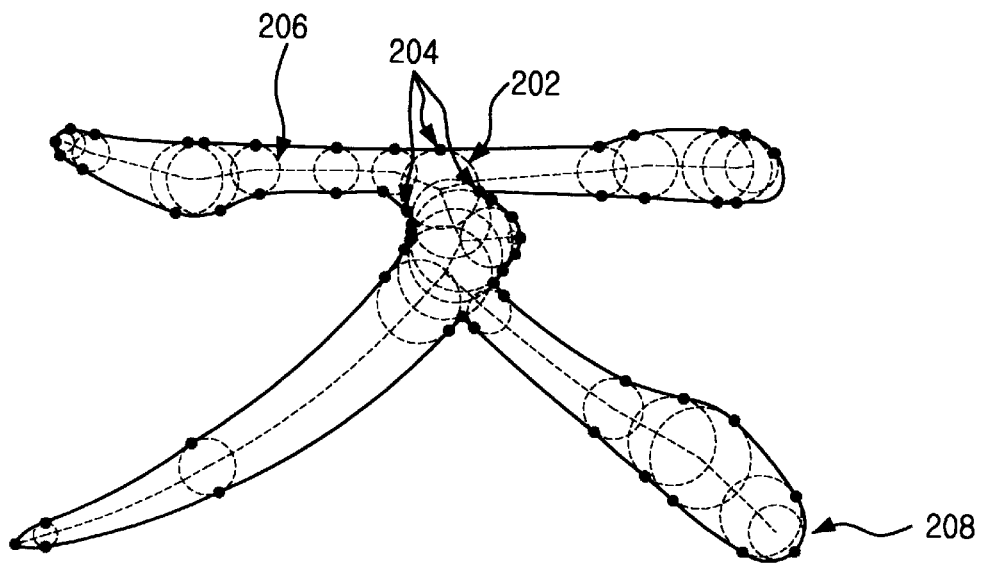
FIG. 2 shows an example of the maximal inscribed circles and the medial axis of the character 'ㅈ' with corresponding contact points of the maximal inscribed circles.

FIG. 1 illustrates the shape and the medial axis of the Korean character 'ㅈ'. FIG. 2 illustrates the maximal inscribed circles and the medial axis of the character 'ㅈ' with corresponding contact points of the maximal inscribed circles.

As mentioned above, the medial axis can be expressed as a set of curves on a plane. A bifurcation point is a point where several of those medial axis curves meet, as shown in point 104 of FIG. 1. A bifurcation circle is a maximal inscribed circle (202 of FIG. 2) which has more than two contact points, and its center is a bifurcation points of the medial axis. A contact point is the point where the maximal inscribed circle meets with the boundary curve of the shape. As shown in 204 of FIG. 2, the bifurcation point has three contact points, but it is possible that the bifurcation point can have more than three contact points. The curve of the medial axis coming from a bifurcation point is a continuous curve without a break, as shown in 106 of FIG. 1, and will meet other bifurcation points, or end up with a medial axis point which is the center of a maximal inscribed circle with one contact point. A maximal inscribed circle having two contact points is shown as 206 of FIG. 2. A point of the medial axis (or corresponding maximal inscribed circle) having n contact points is generally referred to as an n-prong point (or circle).

The characters or the basic shape elements of Korean or Chinese fonts seem to have many sizes and shapes, but in reality many of them differ in size but still can be regarded as having essentially the same shape. For example, 'ㅈ' of Korean character '자' and 'ㅈ' of Korean character '잡' are in fact different in size, but essentially the same in shape. But the aesthetical requirement is that the thickness of the character must not change even though the overall size changes. Of course, characters can be made bigger or smaller through simple multiplication, but in this case the thickness changes. The method using the medial axis transform is a method fulfilling the condition that the thickness must not change. The concept of thickness has been referred to as a stem in the font technology. But, in most cases, it means the distance between two straight lines facing each other, or it means the horizontal or vertical distance of the inner and outer curve facing each other, as in 'o', which is usually referred to as the curve stem. In some outline fonts, where curves change freely as in Korean or Chinese, it is difficult to make a workable definition of the stem.

Medial axis transform can be used to solve the above mentioned problem. That is, the medial axis can be regarded as the curve drawn by the tip of a brush, and the radius information of the medial axis transform can be regarded as the size information of how much the brush is pressed down.

FIG. 2 shows the information of the medial axis transform, and FIG. 3 shows the data of FIG. 2. Rows 302 indicate a list of bifurcation points, or 1-prong points. Hereby, points with three contact points are bifurcation points, and points with one contact point are 1-prong points.

Rows 304 indicates a list of 2-prong points. All these points have two contact points. Column 312 is the coordinates of the medial axis point, column 314 the radius and column 316 the coordinates of the contact points.

Figure 4:
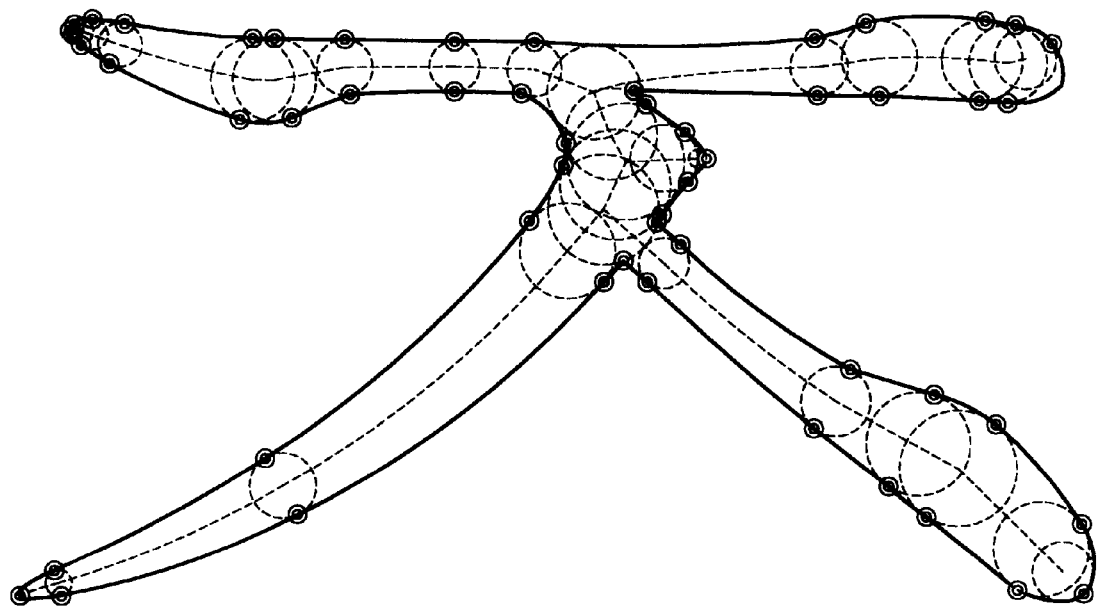
FIG. 4 shows an example of the transformed shape of 'ㅈ' the size of whose bounding box is different from that of the original one shown in FIG. 2.

FIG. 4 shows the transformed shape whose size of bounding box is different from that of the original one. As can be seen, it is important to notice that the radius of the circle remains constant, even though the size of the bounding box has been changed. FIG. 5 illustrates the data of the transformed element. The description method of this data is identical to that shown in FIG. 3.

There are many ways to define the transformation. A typical one is the use of the Affine transform. However, nonlinear transform can be used, especially in the 2-prong algorithm and the guide line algorithm which will be described below. And as will be described below, it can have an aesthetically higher quality by using different Affine transform or a more general nonlinear transform to each locality of the shape. But, as the applications of the various transformations are an embodiment not reaching beyond the method of the invention, the use of one Affine transform will be explained in this invention. Let us first illustrate the use of Affine transform. FIG. 6 illustrates the parameter of the Affine transform used. Reference number 602 indicates matrix A and 604 indicates translation vector b. The principle of this transformation is given by as follows:

First, the Affine transform given by $$T\begin{bmatrix}x\\y\end{bmatrix} = A\begin{bmatrix}x\\y\end{bmatrix} + b = \begin{bmatrix}a & b\\c & d\end{bmatrix}\begin{bmatrix}x\\y\end{bmatrix} + \begin{bmatrix}e\\f\end{bmatrix}$$

must be calculated through the bounding box information surrounding the given shape and the new bounding box where the element will be placed. The Affine transform is illustrated below. In the present invention, an enlargement and a compression of the basic character element is performed in a X or/and Y direction of the rectangular-shaped box and it clearly appears through FIGS. 2 and 4.

In this example, let $(x_1, y_1)$ and $(x_2, y_2)$ respectively be the co-ordinates of the top left corner and the bottom right corner of the original bounding box, and let $(x_3, y_3)$ and $(x_4, y_4)$ respectively be the co-ordinates of the top left corner and the bottom right corner of the new bounding box. Set b=c=0 and $$a = \frac{x_4 - x_3}{x_2 - x_1}, \quad d = \frac{y_4 - y_3}{y_2 - y_1}.$$

Then, e will be $$x_3 - \frac{x_4 - x_3}{x_2 - x_1} x_1$$

and f will be $$y_3 - \frac{y_4 - y_3}{y_2 - y_1} y_1.$$

When the boxes are not rectangular ones, b or c may not be zero.

Suppose an Affine transform, or for that matter a nonlinear mapping, is given. We then have to specify how each maximal inscribed circle is affected. There are three fundamental methods each of which applies to 1-prong circles, 2-prong circles, or bifurcation circles; and for the sake of clarity of presentation, organized below are a 2-prong algorithm, a 1-prong algorithm and a bifurcation algorithm.

By using the Affine transform, the medial axes from the outline provided by the font designer are transformed into a two-dimensional region, which is a predetermined bounding box provided by the font designer. Accordingly, the medial axes associated with an arbitrary character are rearranged in the predetermined bounding box provided by the font designer.

2-Prong Algorithm

FIGS. 7A and 7B illustrates 2-prong algorithm according to the transformation. FIG. 7A illustrates the center P of the maximal inscribed circle before the transformation and the coordinates of the two contact points $R_1$ $(x_1, y_1)$ and $R_2$ $(x_2, y_2)$ pertaining to the center P. Suppose the point where the tangent line $l_1$ through $R_1$ $(x_1, y_1)$ meets another tangent line $l_2$ through $R_2$ $(x_2, y_2)$ is Q. Suppose that θ is the angle between the line segment connecting points P and $R_1$ $(x_1, y_1)$, and the line segment PQ. That is, $$\cos\theta = \frac{r}{|PQ|}.$$

Here |PQ| is the length of the line segment connecting P and Q, and r is the radius of the circle. If $l_1$ and $l_2$ are parallel, Q cannot be defined since it is an infinite point. But since |PQ| is infinity, $$\frac{r}{|PQ|}$$

is 0 and cos θ=0, that is θ=90°. In this case, PQ will be regarded as the line passing through P and parallel to $l_1$ and $l_2$.

Suppose an Affine transform T is applied, point P moves to P'=T(P), as shown in FIG. 7B. And, 2×2 matrix A of the Affine transform will be applied to vector $v=\overrightarrow{PQ}$, and the new vector v'=Av will be calculated. (If θ=90°, $\overrightarrow{v}$ is taken to be a unit vector parallel to the tangent line through the contact points.) Then, from P', the half line will be drawn in the direction of v'. And, θ' can be determined as follows:

$$\theta' = \arccos\left(\frac{|v|\cos\theta}{|Av|}\right).$$

(Here θ' is taken to be $$\left(\text{Here } \theta' \text{ is taken to be } 0° \text{ if } \frac{|v|\cos\theta}{|Av|} \geq 1\right.$$

$$\left. \text{and } 180° \text{ if } \frac{|v|\cos\theta}{|Av|} \leq -1\right);$$

If θ=90°, which means that $l_1$ and $l_2$ are parallel, θ' will be also 90°. If θ' of FIG. 7B is determined, contact point $(x_1', y_1')$ will be determined in such a way that the angle between the half line connecting P' and $(x_1', y_1')$, and the half line P'Q' has to be θ'. If θ'=90°, $R_1$ $(x_1', y_1')$, will be determined so that the half line connecting P' with $R_1$ $(x_1', y_1')$ crosses with the half line P'Q' at right angle.

As stated above, the contact points on the 2-pronged circle of the first inscribed circle provided by a font designer are newly determined on a second inscribed circle, which are transformed by the Affine transform.

1-Prong Algorithm

With respect to 1-prong circles having only one contact point, another algorithm is applied to the contact points of the first inscribed circle.

Figure 8A:
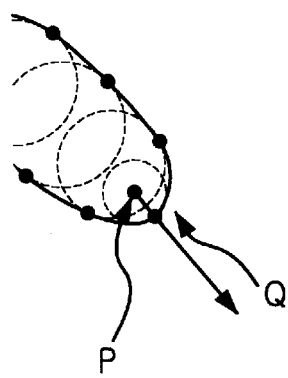
FIGS. 8a and 8b show data related to the 1-prong algorithm.

FIG. 8A is a part of a basic shape element where the circle centered at P has a radius r, and R is the only contact point. If the Affine transform T is determined, the new point P' will be defined as P'=T(P). And, if $v=\overrightarrow{PR}$ is the vector from P to R, the new vector v' will be v'=Av. R' will be the point where the half line from P' in the direction of v' meets with the circle having P' as a center and r as radius (Refer to FIG. 8B).

Method of Joining Contact Points

The new contact points as determined above will be connected with quadratic curves which are the graphic primitive of true type fonts. A third order Bezier curve is needed in the postscript font, in which case one is referred to the comment in "Application of the Method in the Postscript Environment".

Figure 9:
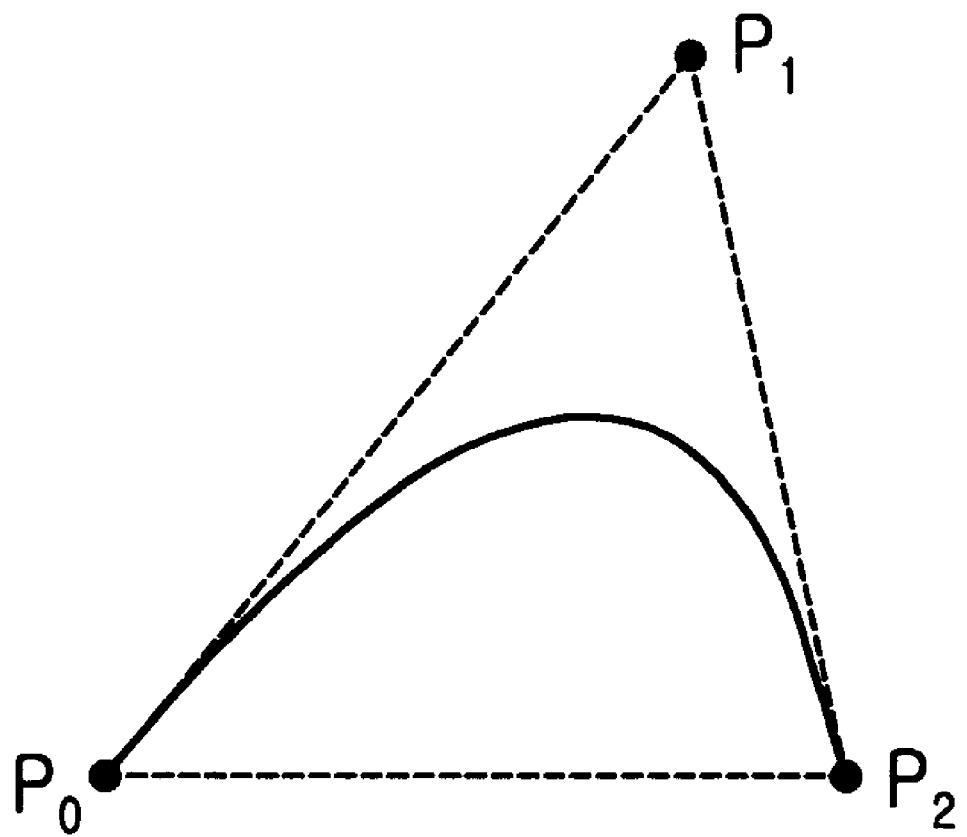
FIG. 9 shows an example of a quadratic curve.

As shown in FIG. 9, if $P_1$ is the point where the two tangent lines through $P_0$ and $P_2$ respectively meet, the quadratic curve is given as:

$$c(t)=(1-t)^2 P_0 + 2(1-t)t P_1 + t^2 P_2,$$

where $0 \leq t \leq 1$. $P_0$ and $P_2$ are called on-points and $P_1$ is called an off point. The newly determined contact point has the tangent vector information along with its location. From this tangent line information, the new off-point connecting the two contact points can be determined. Consequently, the quadratic curve can be drawn with the information of these three points through said formulation. If the two given contact points are connected by a line segment, the newly determined contact points will also be connected by a line segment.

Bifurcation Algorithm

Figure 10A:
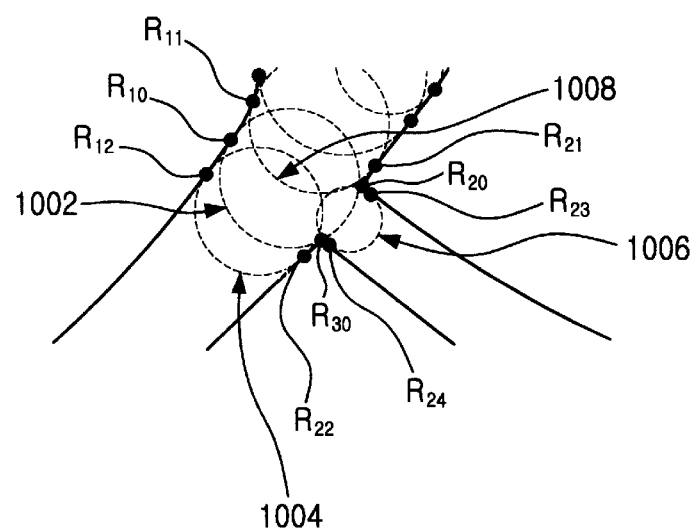
FIGS. 10a and 10b show data related to the treatment of the shape near a bifurcation point.

The treatment of the bifurcation point must follow a different method from the above mentioned one. Around the bifurcation point, many branches of the medial axis come together; and for that reason the shape gets unduly distorted if the bounding box changes its size too much or several Affine transforms are used. In order to prevent this, the following method must be adopted. First (through the algorithm finding a medial axis transform), the bifurcation point must be found. After that, 2-prong circles, 1004, 1006 and 1008, must be selected which are closest to the bifurcation circle 1002, as shown in FIG. 10A. The criterion for selecting those circles is that the curve drawn by the 2-prong circles, except the bifurcation point, must be approximate enough to the original curve. That is, the error should be less than the already expected error if those contact points of the nearby circles selected above are connected with quadratic curves. That is to say that the curve part between 2-prong circles 1010 and 1012 of FIG. 10B will be likewise drawn. In case the contact point of the bifurcation point is on the corner, the two half lines drawn from the two contact points must be found, and the point where the two half lines meet must be found and each contact point must be connected to this new intersection point with a line segment. That is, $R'_{30}$ is the point where the two half lines starting respectively from $R'_{22}$ and $R'_{24}$ meet. $R'_{22}$ and $R'_{30}$ must be connected with a line segment. $R'_{30}$ and $R'_{24}$ of a 2-prong circle 1024 must also be connected with a line segment using the same method. If the bifurcation point moves, as mentioned, the new circle will no longer be the inscribed circle of the newly transformed shape. However, this way, the aesthetic distortion of the transformed shape can be minimized.

Figure 11:
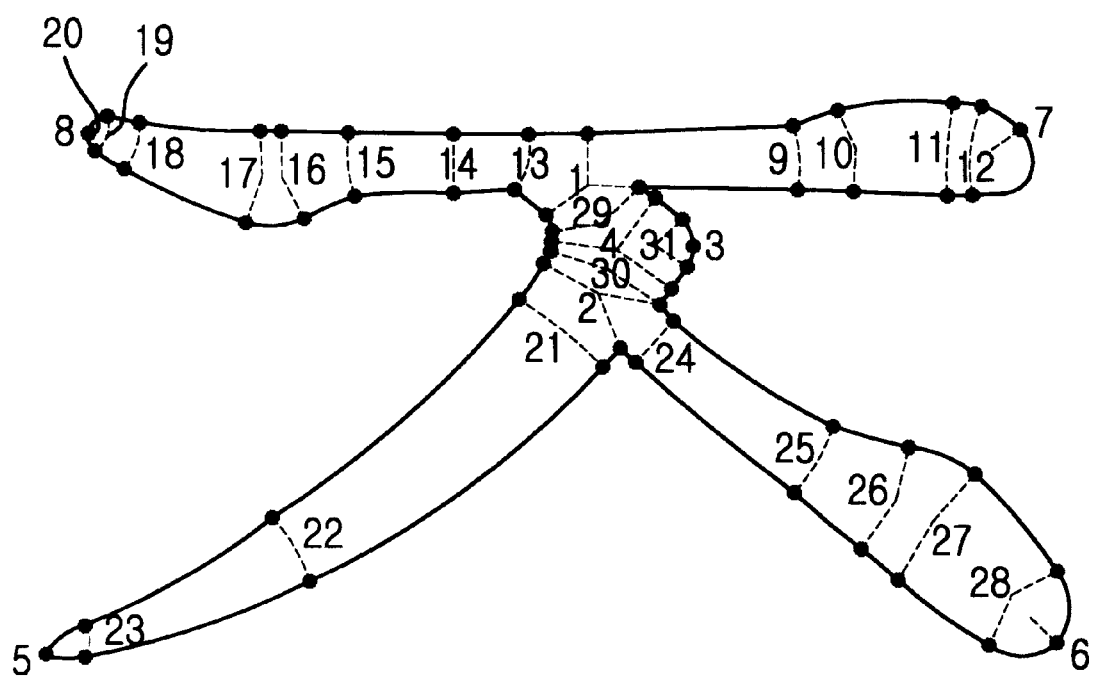
FIG. 11 shows the centers of the circles in FIG. 3 which are numbered according to the order of occurrence in FIG. 3.
Figure 12:
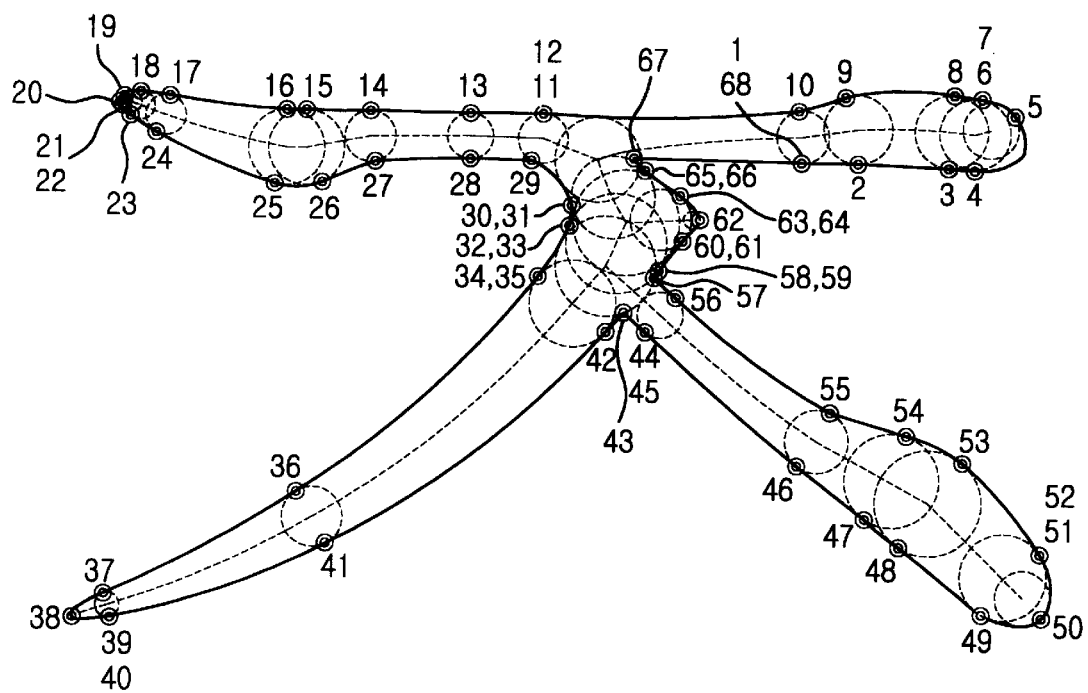
FIG. 12 shows the control points (on-points) of the transformed shape in accordance with the direction of the curve in the counter-clockwise orientation.

By applying the methods explained above, the transformed curve can be drawn from the data of the transformed shape (FIG. 5). FIG. 11 illustrates the related data. It numbers in the order of appearance of the circles contained in the data of FIG. 3, and the circle of the transformed shape has the same order. FIG. 12 shows the on-points of the transformed shape in accordance with the direction of the curve in a counter-clockwise orientation. For the sake of implementation, the next point to the 1-prong point has been written twice, but it does not have any significant meaning. FIG. 13 illustrates the complete showing of on-point and off-point data.

Partial Transformation and Use of Guide Line

The method of transforming and producing a shape, which has been explained above, is an example of using one Affine transform. However, in reality, it is difficult to meet the aesthetic requirement with only one Affine transform. Within the range of the basic principle and realization in the invention, various embodiments can be considered. Some of the examples are as follows:

1. Application of a Different Affine Transform to Each Locality.

As shown in FIG. 1, the inclination of each part in 'ㅈ', especially in reference number 108, can be specified by the font designer to meet the aesthetic requirement. In this case, a single Affine transform cannot be used for all points, but a different Affine transform may be applied to each locality. Here, locality many be regarded to mean a sort of basic shape element. In this case, the locality marked as 108 is separated from the other parts at a bifurcation point, and since the bifurcation point is excluded from the transformation, as explained above, the other localities, which are connected to 108 via the common bifurcation circle, are transformed by different Affine transforms without resulting in too much distortion. In this case, the same 1-prong and 2-prong algorithms are used for each locality, such as the basic shape element marked as 108; and around the bifurcation point, the bifurcation algorithm can be used.

2. Application of a Guide Line

The transformation method explained above generates the transformed curve by calculating the contact points from the transformed medial axis points. However in a real case scenario, it is difficult to control the movement of the medial axis because the curve of the medial axis is bent.

As a result, the aesthetical and visual quality of the transformed shape can be remarkably deteriorated. Consequently, in order to control this, a guide line (normally a line, a half line or a line segment) will be established, and the points of the medial axis will be related to the guide line. The most common method is to designate the point of the medial axis as related to the guide line. Then, the location of the foot point on the guide like can be computed, and the length of the line segment from the point of the medial axis to its foot can also be computed. (Hereinafter, such line segment is called the right-angled foot line.) After that, Affine transform moves the guide line first, calculates the new transformed point of the medial axis through the new information of the foot point location and the length of the right-angled foot line, and finally defines the contact point with the method explained above. This procedure can improve the aesthetic and visual quality of the character. Instead of the guide line, a specially determined curve can be used (guide curve), or a precise control can be given through using several guide lines. All these explained above are the variations within the scope of the invention.

Detailed Description of Guide Line Algorithm

Assuming that a transform T is given, T can be generally nonlinear or Affine transform, which is linear.

In this example the transform T will be regarded as an Affine transform:

$$T: R^2 \to R^2,$$

$$T\begin{bmatrix} x \\ y \end{bmatrix} = A \begin{bmatrix} x \\ y \end{bmatrix} + b,$$

$$A = \begin{bmatrix} a & b \\ c & d \end{bmatrix}, \quad b = \begin{bmatrix} e \\ f \end{bmatrix}.$$

Assuming that l is a guide line, the medial axis point $P(x_0, y_0)$ is related. The foot point F of P to the guide line and the distance from P to the guide line will be computed and memorized for later use. Then the transform T will be applied on the guide line l. Let l' be the transformed guide line. Then, the foot point F will be transformed to a new point F' on the transformed guide line l'. The transformed medial axis point P' will be computed by F' and the distance information computed above. The contact point will be computed by the algorithm explained above(the 2-prong algorithm and the 1-prong algorithm).

In a general situation, a character can have several guide lines, and each guide line can be transformed by its own transform T. So by applying the guide line algorithm, each part of the character can be controlled separately.

Generating Transformed Curve via Envelope of Circles

The transformation method explained above is the method of generating the transformed curve by calculating the contact points of medial axis. In some situations, a small error of tangent direction at a contact point causes a significant change in the shape of the curve. However, it is also possible that a transformed curve can be generated without directly controling the contact points. For example, the transformed curve can be generated by the envelope of transformed medial axis circles.

Let T be a given transform. A medial axis point i.e., the center of an inscribed maximal circle) P is transformed to a new point P'=T(P). Or P' can be determined by the guide line algorithm given above. Do this for all 2-prong points, which compose a branch (a part of curve between bifurcation points or 1-prong points) of medial axis. As a sequence of the transformed point together with the corresponding radius information can be regarded as a sequence of point in $R^3$, one can then compute the curve in $R^3$ which interpolates (or approximates) those points in $R^3$. This curve in $R^3$ can be regarded as a branch of transformed medial axis. Since each point in $R^3$ corresponds to a circle in $R^2$, this curve represents a set of circles moving continuously. The envelope curve of this set of circles is the curve which is tangent to all of these circles. In this situation, two envelope curves at both sides are generated. These two envelope curves can be treated as a result of transformation. In should be remarked the computation of the envelope curve is well known in the trade of font technology.

Detailed Procedures of Algorithms

An embodiment of the invention was given above. Below, a detailed procedure of algorithms of the invention will be explained:

Procedure of a 2-Prong Algorithm

Here, referring now to FIGS. 7A and 7B, the procedure of a 2-prong algorithm will be explained with the same notation defined above at 2-prong algorithm:

Step 1. 2-prong point P will be moved to P' as follows:

P'=T(P).

Step 2. v' will be computed as follows:

v'=Av where v=$\overrightarrow{PQ}$.

Step 3. θ' will be determined as follows:

$$\theta' = \arccos\left(\frac{|v|\cos\theta}{|Av|}\right).$$

However, it must be remembered that A is the Jacobian matrix of the transform T on P, in case T is nonlinear.

Step 4. Points $R_1'$ and $R_2'$ are determined as follows:

The angle between P'Q' and P'$R_1'$ is θ' and the distance from P' to $R_1'$ is the same as the radius r. Likewise the angle between P'Q' and P'$R_2'$ is θ' and the distance from P' to $R_2'$ is the same as the radius r.

Procedure of a 1-Prong Algorithm

Figure 8B:
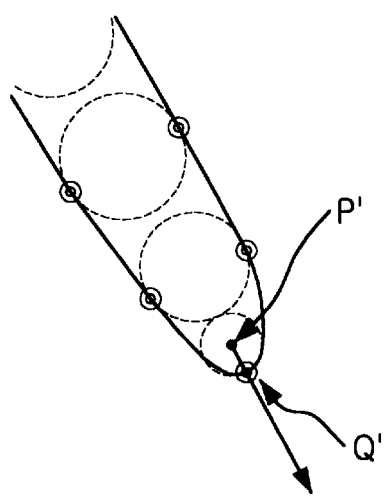

Referring to FIGS. 8A and 8B, the procedure of a 1-prong algorithm will be explained with the same notation defined above at a 1-prong algorithm:

Step 1. P will be moved to P', and it will be determined as follows:

P'=T(P).

Step 2. Assume that v'=Av. However, if T is nonlinear, A is the Jacobian matrix of the transform T at P.

Contact point R will be moved to R', and that will be the point where the distance from P' is r in the v' direction. Thus, R' is given by $$R' = P' + r\frac{v'}{|v'|}.$$

Procedure of a Bifurcation Algorithm

Figure 10B:
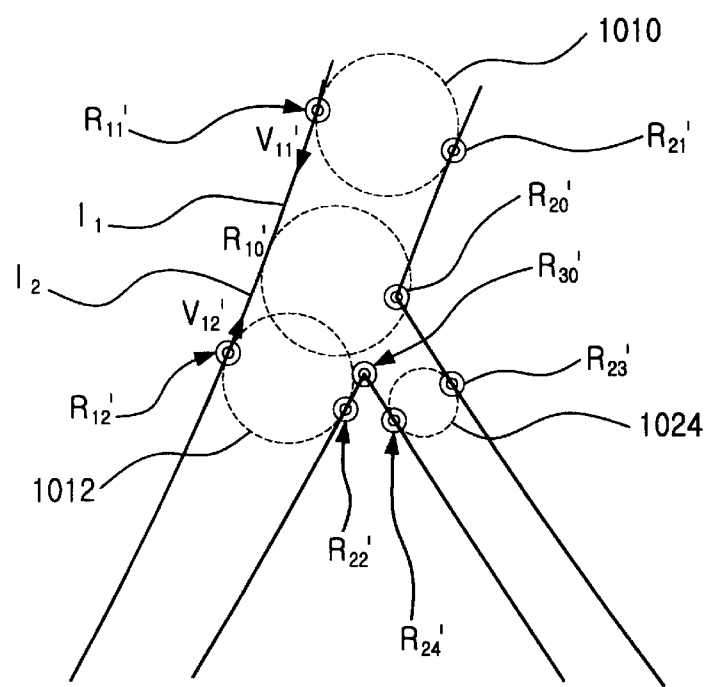

First as shown in FIGS. 10A and 10B, assuming that $R_{10}$, $R_{20}$ and $R_{30}$ are contact points of the bifurcation circle 1002. The bifurcation circle 1002 will be transformed based on adjacent 2-prong circles, 1004, 1006 and 1008 as follows:

Step 1. On-points $R_{11}$ and $R_{12}$ must be found which are most closely connected to $R_{10}$ on the curve. The three points $R_{11}$, $R_{10}$ and $R_{12}$ are connected, in order, along the positive direction of the curve, and $R_{11}$ and $R_{12}$ are the contact points of the 2-prong circles. Vectors $v_{11}$ and $v_{12}$ are the direction vectors of the curve on $R_{11}$ and $R_{12}$, respectively.

Step 2. $R_{11'}$, $R_{12'}$, $v_{11}'$, and $v_{12}'$ can be obtained through the transformation of $R_{11}$, $R_{12}$, $v_{11}$ and $v_{12}$ through the 2-prong algorithm. $l_1$ will be the half line starting from $R_{11'}$ in the direction of $v_{11'}$, $l_2$ will be the half line starting from $R_{12'}$ in the direction of $v_{12'}$, and $R_{10'}$ will be the intersection point of $l_1$ and $l_2$.

Step 3. If $R_{20}$ and $R_{30}$ are corner points, the transformed curves can be generated by connecting points $R_{21'}$ and $R_{22'}$ with line segment passing through contact points $R_{23}'$ and $R_{24}'$ of another adjacent 2-prong circle 1024 at points $R'_{20}$ and $R'_{30}$ respectively. If $R_{10}$ is not a corner point, the transformed curve can be generated by connecting points $R_{11}'$ and $R_{12}'$ with the quadratic curve, with point $R_{10}'$ as an off-point.

Procedure of a Guide Line Algorithm

The procedure of a guide line algorithm will be explained with the same notation defined above at a Guide line algorithm:

Step 1. The relation of l and P will be established.

If l is a line, F will be the right-angled line foot point from P to l, and F and |PF| will be memorized.

Step 2. T will be applied on l, and the transformed guide line l' will be obtained. In the example of step 1, it will be determined that F'=T(F).

Step 3. Transformed point P' will be defined according to the relation of l and P established in step 1. In the example of step 1, it will be determined that $$P'=F'+|PF|w,$$

where w is the unit vector in the direction perpendicular to l'.

Through steps 1, 2 and 3, transform M, which is transforming P to P', will be given, and M can either be linear or nonlinear.

Step 4. the Jacobian matrix B will be defined near P $(x_0, y_0)$.

Let M be a map given by M(x,y)=(u(x,y), v(x,y)), the Jacobian matrix B can be calculated at P as:

$$B = \begin{bmatrix} \frac{\partial u}{\partial x}(x_0, y_0) & \frac{\partial u}{\partial y}(x_0, y_0) \\ \frac{\partial v}{\partial x}(x_0, y_0) & \frac{\partial v}{\partial y}(x_0, y_0) \end{bmatrix}$$

If $(x_0, y_0)$ is a 2-prong point, step 5 will follow, and if $(x_0, y_0)$ is a 1-prong point, step 5' will follow.

Step 5. Let's assume that v'=Bv, Q'=P'+v'.

The points $R_1'$ and $R_2'$ will be determined by requiring that segment $P'R_1'$ and $P'R_2'$ composes the angle $\theta$ with P'Q' and the distance from P' is r. Here, $\theta'$ is determined by $$\theta' = \arccos\left(\frac{|v|\cos\theta}{|Bv|}\right)$$

Step 5'. Let v' be Bv. Q', where Q will be moved to, is defined as:

$$Q' = P' + r\frac{v'}{|v'|}.$$

Font Data

In order to realize the invention, the selection of the control point is very important. The most desirable case is where the on-points are all given as contact points of the maximal inscribed circle whose center is a point of the medial axis. If this is the case, the on-points with corresponding points will already be on the circle with the determined radius, the thickness will be maintained naturally and the algorithm of the invention can be realized as intended. But like the method most commonly used, the invention can be applied to the font written in the conventional format, since the maximal inscribed circle contacting each on-point can be found, even though not all contact points are designated as on-points.

Rasterizing and Hinting

The invention enables the rasterizer to easily standardize the thickness of the stroke when constructing the bitmap. The reason lies in that the bitmap pattern made by the circles with the same radius will always be the same when the center of the maximal inscribed circle is fixed on a point, such as the intersection point of the vertical and the horizontal grid lines, or the center point of a pixel.

This explains that the effect of the hinting algorithm can easily be achieved when the center of the maximal inscribed circle is moved in a fixed method.

Application of the Method in the Postscript Environment

Next it will be described what parts will be altered in realizing the invention in the postscript environment, where the cubic Bezier curves are the graphical primitives. Since this example does not deviate from the range of the invention, the parts which can be changed will be described briefly. The cubic Bezier curve c(t) has two off points, for example, $P_1$ and $P_2$ between two on-points $P_0$ and $P_3$, and it is given by:

$$c(t)=(1-t)^3P_0+3(1-t)^2tP_1+3(1-t)t^2P_2+t^3P_3,$$

where $0 \leq t \leq 1$.

In order to locate two off-points, the guide point must be added on the original curve. That is, if $c(0)=P_0$ and $c(1)=P_3$, the guide points, for example, $Q_1$, $Q_2$ and $Q_3$ will be chosen on the original curve as follows:

$$Q_1=c(¼), Q_2=c(½), Q_3=c(¾).$$

And, the medial axis point corresponding to those three points will be found and will be moved by said method. Also, the transformed points $Q_1'$, $Q_2'$ and $Q_3'$ will be computed by the above methods. And, if $P_0'$, $P_3'$ is the moved location of on-points $P_0$ and $P_3$, off-points $P_1'$ and $P_2'$ must be selected in order to minimize the error between the cubic Bezier curve to be found and the piecewise linear curve traversed in the order $P_0' \rightarrow Q_1' \rightarrow Q_2' \rightarrow Q_3' \rightarrow P_3'$.

The other process will be the same as the quadratic curve.

This invention can resize a basic shape element from the original bounding box to a given new bounding box while maintaining the important form of the shape, such as the thickness of the stroke.

What is claimed is:

1. A method for transforming a first outline of a basic character element to a second outline which is fitted in a predetermined box on a computer display apparatus, the method comprising the steps of:

(a) providing data of the first outline of the basic character;

(b) determining a first transform function according to a size and a shape of the predetermined box provided by a font designer wherein the predetermined box is a rectangular shaped box;

(c) calculating information about first inscribed circles of the first outline, wherein the information includes centers, radii and contact points which are in contact with the first outline;

(d) applying a first transform function to the centers of the first inscribed circles and producing transformed centers within the rectangular-shaped box to form second inscribed circles;

(e) creating the second inscribed circles based on the transformed centers and the radii of the first inscribed circles, wherein an enlargement and a compression of the basic character element is performed in one of an X direction, a Y direction, and an X and Y direction of the rectangular-shaped box;

(f) applying a second transform function to the contact points of the first inscribed circles and producing transformed contact points; and (g) producing the second outline from the transformed contact points, to thereby display the second outline on the computer display apparatus.

2. The method in accordance with claim 1, wherein the first outline of the basic character element is made up for a plurality of strokes, wherein each stroke is subject to a different transform function and wherein the method includes a step of designating the stroke which is subject to the function differently transforms angles between the strokes in different proportion.

3. The method in accordance with claim 1, wherein the step (f) comprises the steps of determining 2-prong points for creating the second outline, the step of determining 2-prong points comprising the steps of:

determining vectors passing through the determined centers of the second inscribed circles;

determining angles between the vectors and the contact points to be determined on the second inscribed circles based on information about the first inscribed circle; and determining the contact points of the second inscribed circles based on the determined vectors and angles and the radii of the first inscribed circles.

4. The method in accordance with claim 3, wherein the step (f) comprises the steps of determining 1-prong points for creating the second outline, the step of determining the 1-prong points comprising the steps of:

determining vectors passing through the determined centers of the second inscribed circles; and determining the contact points of the second inscribed circles based on the determined vectors and the radii of the first inscribed circles.

5. The method in accordance with claim 4, wherein the step (e) comprises the steps of processing bifurcation (n-prong) points to have at least three contact points for creating the second outline, the step of processing the bifurcation points comprising the steps of:

if the contact points of the first inscribed circles is not in the corner of the basic character element, determining the contact points of the second inscribed circle which is adjacent to a circle having the bifurcation points, and, if the contact points of the first inscribed circles is in the corner of the basic character element, considering connection points taken along the strokes of the basic character element as the contact points.

6. A method for transferring a first outline of a basic character element to a second outline which is fitted in a predetermined box on a computer display apparatus, the method comprising the steps of:

(a) providing data of the first outline of the basic character;

(b) determining a first transform function according to a size and a shape of the predetermined box provided by a font designer, wherein the predetermined box is a rectangular-shaped box;

(c) calculating information about first inscribed circles of the first outline, wherein the information includes centers, radii and contact points which are in contact with the first outline;

(d) setting a guide line for reestablishing medial axes of a portion of second inscribed circles;

(e) applying a first transform function to the center of the first inscribed circles and producing transformed centers within the rectangular-shaped box to form second inscribed circles, wherein the reestablished medial axes of the second inscribed circle are positioned on the guide line;

(f) creating the second inscribed circles based on the transformed centers and the radii of the first inscribed circles, wherein an enlargement and a compression of the basic character element is performed in one of an X direction, a Y direction, and an X and Y direction of the rectangular-shaped box;

(g) applying a second transform function to the contact points of the first inscribed circles and producing transformed contact points; and (h) producing the second outline from the transformed contact points, to thereby display the second outline on the computer display apparatus.

7. The method in accordance with claim 6, wherein the first outline of the basic character element is made up for a plurality of strokes, wherein each stroke is subject to a different transform function and wherein the method includes a step of designating the stroke which is subject to the different transform function so that the different transform function differently transforms angles between the strokes in different proportion.

8. The method in accordance with claim 6, wherein the step (g) comprises the steps of determining 2-prong points for creating the second outline, the step of determining 2-prong points comprising the steps of:

determining vectors passing through the determined centers of the second inscribed circles;

determining angles between the vectors and the contact points to be determined on the second inscribed circles based on information about the first inscribed circle; and determining the contact points of the second inscribed circles based on the determined vectors and angels and the radii of the first inscribed circles.

9. The method in accordance with claim 8, wherein the step (g) comprises the steps of determining 1-prong points for creating the second outline, the step of determining the 1-prong points comprising the steps of:

determining the vectors passing through the determined centers of the second inscribed circles; and determining the contact points of the second inscribed circles based on the determined vectors and the radii of the first inscribed circles.

10. The method in accordance with claim 9, wherein the step (e) comprises the steps of processing bifurcation (n-prong) points to have at least three contact points for creating the second outline, the step of processing the bifurcation points comprising the steps of:

if the contact points of the first inscribed circles is not in the corner of the basic character element, determining the contact points of the second inscribed circle which is adjacent to a circle having the bifurcation points, and, if the contact points of the first inscribed circles is in the corner of the basic character element, considering connection points taken along the strokes of the basic character element the contact points as the contact points.

11. A method for transferring a first outline of a basic character element to a second outline which is fitted in a predetermined box on a computer display apparatus, the method comprising the steps of:

(a) providing data of the first outline of the basic character;

(b) determining a transfer function according to a size and a shape of the predetermined box provided by a font designer wherein the predetermined box is a rectangular shaped box;

(c) calculating information about first inscribed circles of the first outline, wherein the information includes centers, radii and contact points which are in contact with the first outline;

(d) applying a first transform function to the centers of the first inscribed circles and producing transformed centers within the rectangular-shaped box to form second inscribed circles;

(e) creating the second inscribed circles based on the transformed centers and the radii of the first inscribed circles, wherein an enlargement and a compression of the basic character element is performed in one of an X direction, a Y direction, and an X and Y direction of the rectangular-shaped box; and (f) producing an envelope curve according to the second inscribed circles, to thereby display the second outline on the computer display apparatus.

* * * * *